US011210376B2

(12) United States Patent
Smits

(10) Patent No.: US 11,210,376 B2
(45) Date of Patent: Dec. 28, 2021

(54) SYSTEMS AND METHODS FOR BIOMETRIC USER AUTHENTICATION

(71) Applicant: Samsung Electronics Co., Ltd., Suwon-si (KR)

(72) Inventor: Gerard Dirk Smits, Los Gatos, CA (US)

(73) Assignee: Samsung Electronics Co., Ltd.

( * ) Notice: Subject to any disclaimer, the term of this patent is extended or adjusted under 35 U.S.C. 154(b) by 47 days.

(21) Appl. No.: 16/229,634

(22) Filed: Dec. 21, 2018

(65) Prior Publication Data

US 2019/0197224 A1    Jun. 27, 2019

Related U.S. Application Data

(60) Provisional application No. 62/608,690, filed on Dec. 21, 2017.

(51) Int. Cl.
| | |
|---|---|
| *G06F 21/32* | (2013.01) |
| *G06T 7/20* | (2017.01) |
| *G06K 9/00* | (2006.01) |
| *G06F 3/01* | (2006.01) |

(52) U.S. Cl.
CPC .............. *G06F 21/32* (2013.01); *G06F 3/012* (2013.01); *G06K 9/00315* (2013.01); *G06T 7/20* (2013.01); *G06F 2203/011* (2013.01); *G06T 2207/10021* (2013.01); *G06T 2207/30201* (2013.01)

(58) Field of Classification Search
CPC .... G06F 21/32; G06F 3/012; G06F 2203/011; G06F 3/0304; G06F 3/017; G06T 7/20; G06T 2207/30201; G06T 2207/10021; G06K 9/00315; G06K 9/00201; G06K 9/00288
USPC ........................................................ 726/19
See application file for complete search history.

(56) References Cited

U.S. PATENT DOCUMENTS

| | | |
|---|---|---|
| 9,384,486 B2 | 7/2016 | Gumani et al. |
| 2008/0104415 A1 | 5/2008 | Palti-Wasserman et al. |
| 2014/0007224 A1 | 1/2014 | Lu et al. |
| 2016/0212466 A1 | 7/2016 | Nauseef et al. |
| 2017/0032784 A1 | 2/2017 | Dadu et al. |
| 2017/0053109 A1 | 2/2017 | Han et al. |
| 2017/0098122 A1 | 4/2017 | el Kaliouby et al. |
| 2017/0357969 A1 | 12/2017 | Huang et al. |
| 2018/0129795 A1 | 5/2018 | Katz-Oz et al. |
| 2018/0232508 A1 | 8/2018 | Kursun |
| 2018/0232511 A1 | 8/2018 | Bakish |
| 2018/0285868 A1 | 10/2018 | O'Hara et al. |
| 2018/0286404 A1 | 10/2018 | Cech et al. |
| 2018/0307815 A1* | 10/2018 | Samadani .......... H04N 5/23293 |
| 2019/0065875 A1* | 2/2019 | Sheikh Faridul .. G06K 9/00275 |

OTHER PUBLICATIONS

Int'l Preliminary Report on Patentability Appln. No. PCT/KR2018/016541 dated Jul. 2, 2020 (10 pgs.).

\* cited by examiner

*Primary Examiner* — Jeffrey C Pwu
*Assistant Examiner* — Nega Woldemariam
(74) *Attorney, Agent, or Firm* — McAndrews, Held & Malloy, Ltd.

(57) ABSTRACT

Provided is a disclosure for user authentication using biometric features such as detection of micro-expressions of a user.

18 Claims, 7 Drawing Sheets

SYSTEMS AND METHODS FOR BIOMETRIC USER AUTHENTICATION

RELATED APPLICATIONS

This application claims the benefit of the United States Provisional Application 62/608,690, filed on Dec. 21, 2017, the disclosure of which is incorporated herein in its entirety by reference.

BACKGROUND

The present disclosure relates to user authentication, and more particularly, to biometric user authentication. Currently, various efforts are being made for authenticating users, but these methods may not reliably identify the user.

Various limitations and disadvantages of conventional and traditional approaches will become apparent to one of skill in the art, through comparison of such systems with some aspects of the present disclosure as set forth in the remainder of this application with reference to the drawings.

SUMMARY

Systems and/or methods for biometric user authentication, substantially as shown in and/or described in connection with at least one of the drawings.

Various advantages, aspects, and novel features of the present disclosure, as well as details of an illustrated embodiment thereof, will be more fully understood from the following description and drawings.

BRIEF DESCRIPTION OF THE DRAWINGS

The above and other objects, features and advantages of the present disclosure will become more apparent from the following detailed description when taken in conjunction with the accompanying drawings in which.

DETAILED DESCRIPTION

Figure 1:
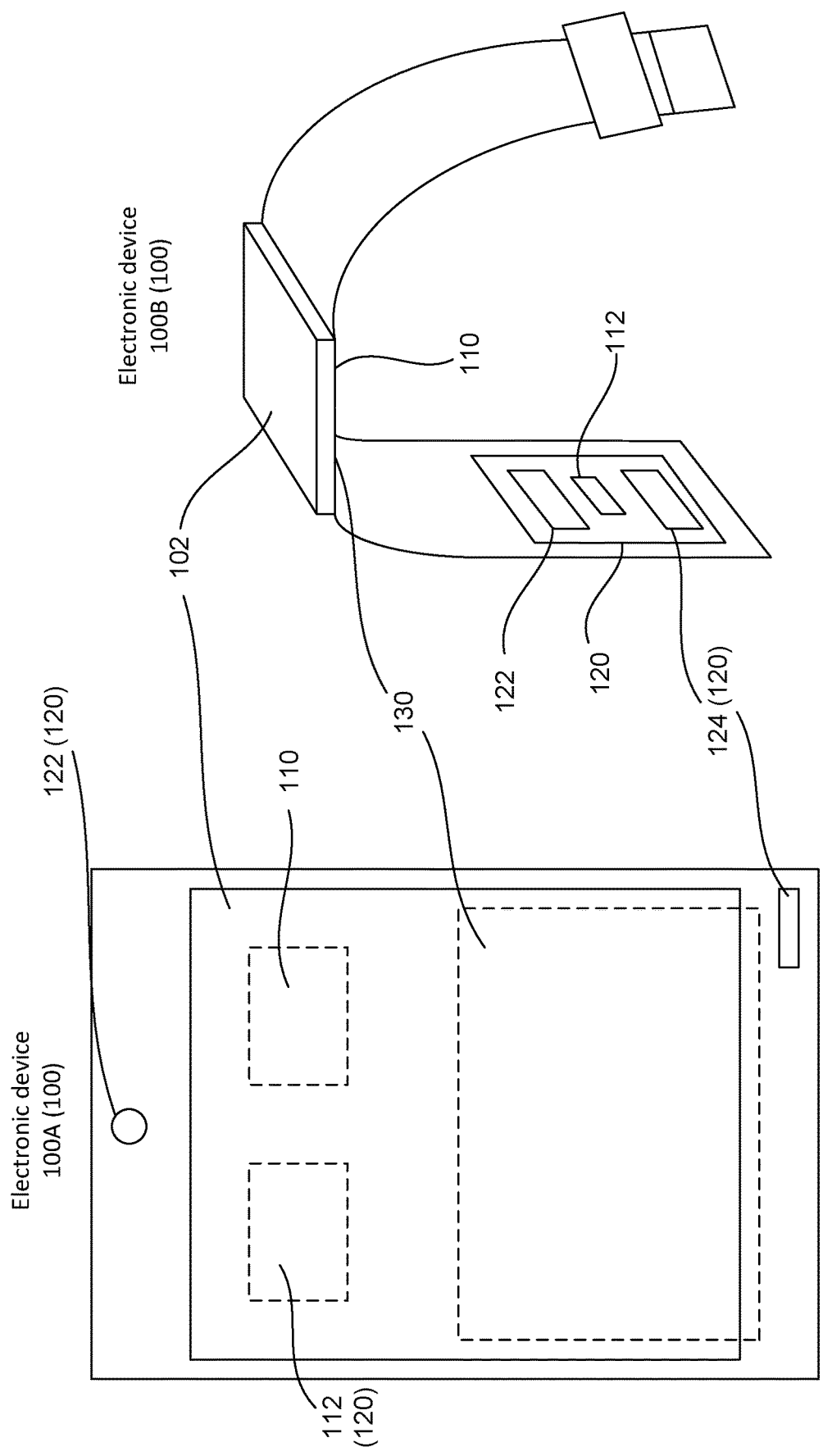
FIG. 1A is a diagram of an example electronic device that includes user authentication in accordance with an embodiment of the disclosure.
FIG. 1B is a diagram of another example electronic device that includes user authentication in accordance with an embodiment of the disclosure.

The present embodiments should not be construed as being limited to the descriptions set forth herein. Rather, these embodiments are provided as examples so that this disclosure will be thorough and complete and will fully convey the concept of the present embodiments to one of ordinary skill in the art. The appended claims illustrate some of the embodiments of the present disclosure.

Like reference numerals refer to like elements throughout the specification. All terms including descriptive or technical terms used herein should be construed as having meanings that are obvious to one of ordinary skill in the art. When a term has an ambiguous meaning due to evolving of language, precedent cases, or the appearance of new technologies, the meaning of a term used in this disclosure should first be clarified by its usage and/or definition in this disclosure. The term should then be clarified as one of ordinary skill in the art would have understood the term at the time of this disclosure.

When a part "includes" or "comprises" an element, unless there is a particular description contrary thereto, the part can further include other elements. The term "unit" in the embodiments of the present disclosure means a software component or a hardware component that performs a specific function. The hardware component may include, for example, a field-programmable gate array (FPGA) or an application-specific integrated circuit (ASIC).

Software, or software component, may refer to executable code and/or data used by the executable code in an addressable storage medium. Thus, software may be, for example, object-oriented software components, class components, and task components, and may include processes, functions, attributes, procedures, subroutines, segments of program code, drivers, firmware, application programs, micro codes/circuits, data, a database, data structures, tables, arrays, or variables.

A function provided by a "unit" may be divided into additional components and "units."

Reference will now be made in detail to embodiments, examples of which are illustrated in the accompanying drawings. In this regard, the present embodiments may have different forms and should not be construed as being limited to the descriptions set forth herein.

In the following description, well-known functions or constructions are not described in detail so as not to obscure the embodiments with unnecessary detail.

FIG. 1A and FIG. 1B are diagrams of example electronic devices that include a user authentication feature in accordance with various embodiments of the disclosure. FIGS. 1A and 1B show two non-limiting examples of an electronic device 100 with an embodiment of the disclosure for user authentication. As shown, the electronic device 100 may be, for example, the smartphone 100A in FIG. 1A comprising a display 102, a control module 110, a sensor module 120, and a battery 130. The electronic device 100 may also be, for example, the smart watch 100B in FIG. 1B similarly comprising a display 102, a control module 110, a sensor module 120 with a first sensor 122, a second sensor 124, and a processor 112, and a battery 130.

It may be noted that an electronic device 100 may have other features that may be specific to that type of electronic device, including various sensors not specifically disclosed as being part of the sensor module 120. The drawings of the electronic devices 100 in FIGS. 1A and 1B are simplified for the sake of brevity.

Generally, an electronic device 100 may be able to communicate with other electronic devices. For example, an electronic device 100 may be able to communicate with a smartphone, a smart watch, a laptop/PC, a server, etc. This will be described in more detail with respect to FIG. 3.

The display 102 may output, for example, whether the user was identified and given access to the functionality of the electronic device 100. The electronic device 100 may have camera(s) as the first sensor 122 and a microphone as the second sensor 124. Accordingly, the user may make specific sounds captured by the second sensor (microphone) 124 while the first sensor (camera(s)) 122 capture the user's face as the user is making the sounds. The sounds and the videos may then be processed and correlated by, for example, the processor 112 and/or other processors that may be in the electronic device 100, and then compared by the processor 112 and/or other processors to stored information correlating sounds with facial pictures/videos. The sensor 122 may comprise a 3-D (3-dimensional) camera and/or a 2-D (2-dimensional) camera. Thus videos as described herein may consist of motion video and/or still picture. Upon a successful match, the electronic device 100 may be unlocked for the user. This process is discussed in more detail with respect to FIGS. 4 and 5.

Various embodiments of the disclosure may use a broad usage for the term "camera." That is, a camera may be used to refer to any kind of motion sensor system that is able to map a surface, such as, for example, ultrasound, sonar, optical speckle/interference, radar, Lidar, time of flight devices, scanned systems, etc.

In another embodiment, the electronic device 100 may have camera(s) as the first sensor 122 that may capture a video of the user when a stimulus is provided to the user. The stimulus may be the voice of a loved one and/or a picture/ video of a loved one. In this case, the stimulus may be referred to as an emotional stimulus where the emotional stimulus will be relevant to the user, and, therefore, the user will respond with an emotional response. The emotional stimulus is a pre-determined emotional stimulus that may have been selected, for example, by the user during a setup of the authentication process. In other cases, the pre-determined emotional stimulus may have been selected by the authentication application from, for example, the user's stored video and/or sound recordings.

Accordingly, the first sensor (camera(s)) 122 may be used to capture motion detection in the user's face as the emotional stimulus is provided. In some embodiments, the motion detection may be referred to as an emotional response of the user to the emotional stimulus. The motion detection may comprise, for example, micro-expressions that may include voluntary and/or involuntary muscle movements in the user's face. These micro-expressions may include muscle movements that may, for example, not be discernable to a viewer with the naked eye. This may be because the movement is too fast and/or too small. However, the captured motion detection may be processed to be able to identify these micro-expressions.

The pictures/videos may be processed by, for example, the processor 112 and/or other processors that may be in the electronic device 100, and then compared by the processor 112 and/or other processors to stored information (data), which may be referred to for various embodiments as an expected facial motion or an expected emotional response. Upon a successful match, the electronic device 100 may be unlocked for the user or an application may allow the user to complete a transaction. For example, the authentication may allow withdrawal of money from an ATM (automatic teller machine) or allow transfer of money from one account to another, etc. This is discussed in more detail with respect to FIGS. 6 and 7.

The control module 110 may also have a processor 200 (FIG. 2) that can be used to process the recorded sounds and the pictures/videos to determine whether the user is identified. The sensor module 120 may include other sensors such as, for example, an accelerometer, a magnetometer, light sensor, proximity sensor, etc. The battery 130 may be configured to provide power for the electronic device 100. The battery 130 may be charged using a wired charging system or a wireless charging system.

Furthermore, while two specific electronic devices 100A and 100B are described, various embodiments of the disclosure need not be limited so. Various other electronic devices may also be used for the embodiments of the disclosure. A non-restrictive list may include, for example, a PC, a laptop, a tablet, an ATM, an authentication module that may be used to authenticate a user, smart eyeglasses that may be able to provide a stimulus and capture video/images of a user's eye(s) and/or other facial regions, as well sounds made by the user, etc. Accordingly, various embodiments of the disclosure are applicable wherever a person needs to be identified and the authentication may be performed by any device, wearable or not, that can perform the described functions for authenticating a user. Although the authentication system may be used to identify the user, in some cases, the authentication system might only be used to grant access to the device without knowing the identity of the user. For example, a mobile phone may not be given details of the identity of the authorized owner of the phone, but the authentication system could still be used to grant access to that owner that it has been trained to recognize.

Figure 2:
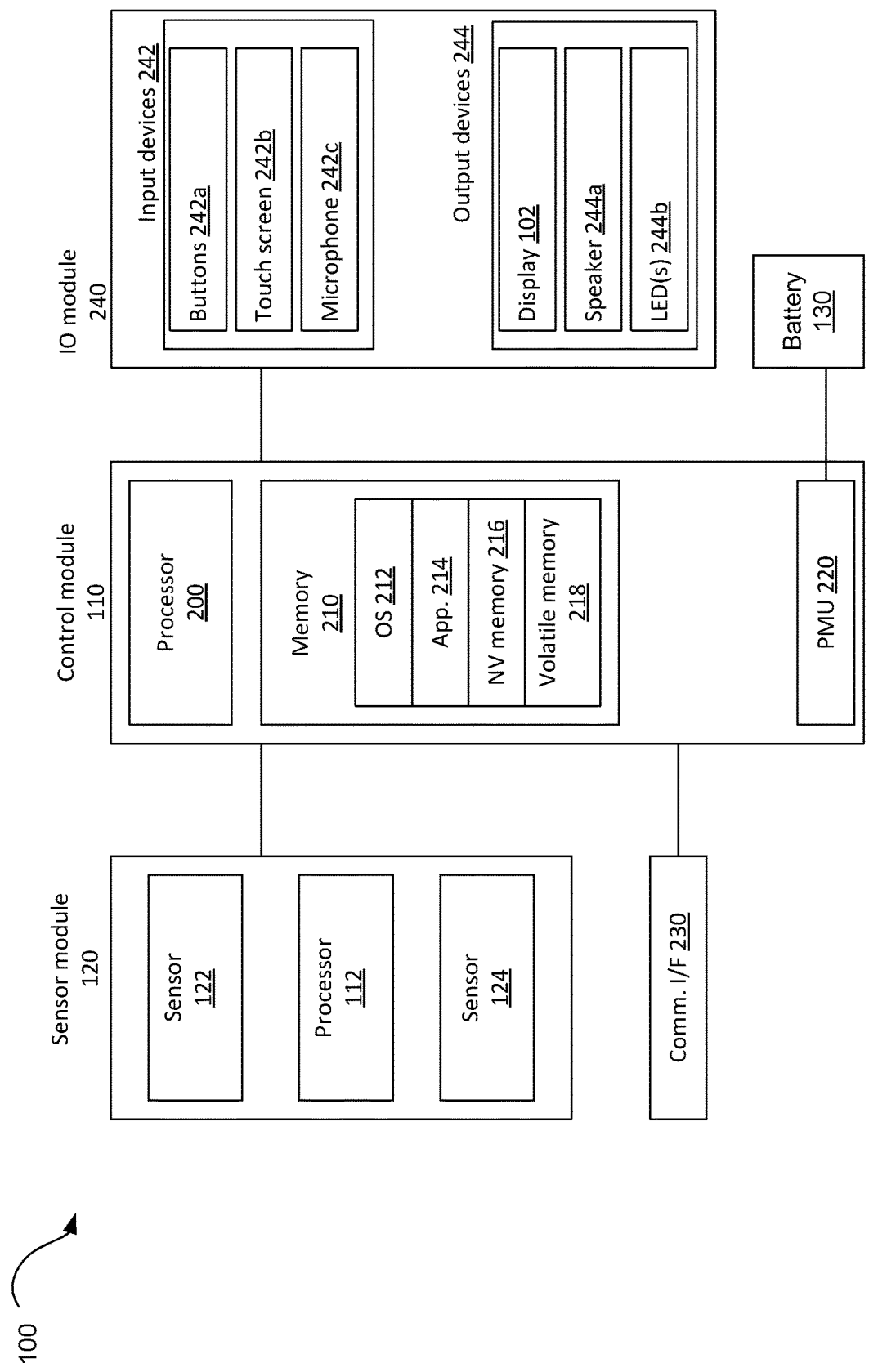
FIG. 2 is an example high-level block diagram of an electronic device that includes user authentication in accordance with an embodiment of the present disclosure.

FIG. 2 is a high-level block diagram of an electronic device in accordance with an embodiment of the present disclosure. Referring to FIG. 2, there is shown the electronic device 100 comprising the control module 110, the sensor module 120, the battery 130, the communication interface 230, and the input/output (IO) module 240. The control module 110 may include a processor 200, memory 210, and a power management unit (PMU) 220. The IO module 240 may comprise the display 102, input devices 242, and output devices 244.

The processor 200 may generally control the electronic device 100, including processing the monitored signals from the sensor module 120, communicating with the IO module 240, and communicating with other electronic devices via the communication interface 230. The memory 210 may include non-volatile memory 216 and volatile memory 218. The operating system 212 and applications 214 may be stored in the non-volatile memory 216. Various embodiments of the disclosure may use different memory architectures that are design and/or implementation dependent.

The PMU 220 may control receiving power from an outside source, charging the battery 130, as well as allocation of power to the different parts of the electronic device 100. The communication interface 230 may allow the electronic device 100 to communicate with other devices via, for example, a wired protocol such as USB, Ethernet, Firewire, etc., or a wireless protocol such as Bluetooth, Near Field Communication (NFC), WiFi, etc.

The processor 200 may communicate with the IO module 240 to receive input information via the input devices 242 and output information to be displayed on the display 102, as well as other output devices 244. The input devices 242 may comprise, for example, buttons 242a, touch sensitive screen 242b that may be a part of the display 102, microphone 242c, etc. The output devices 244 may comprise, for example, the display 102, a speaker 244a, LEDs 244b, etc.

The processor 112 may operate using different architectures in different embodiments. For example, the processor 112 may use the memory 210 to store instructions to execute, or the processor 112 may have its own memory (not shown) for its instructions. Although some embodiments have separate processors 200 and 112, various embodiments need not be limited so. There may be one processor 200 that controls the functionality of the electronic device 100, or there may be multiple processors for the electronic device 100.

Various embodiments may use other architectures where the different functionalities are grouped differently. For example, the grouping may be in different integrated circuit chips. Or the grouping may combine different devices such as the IO module 240 and the communication interface 230 together, or the microphone 242c may be grouped as part of the sensor module 120, etc.

Figure 3:
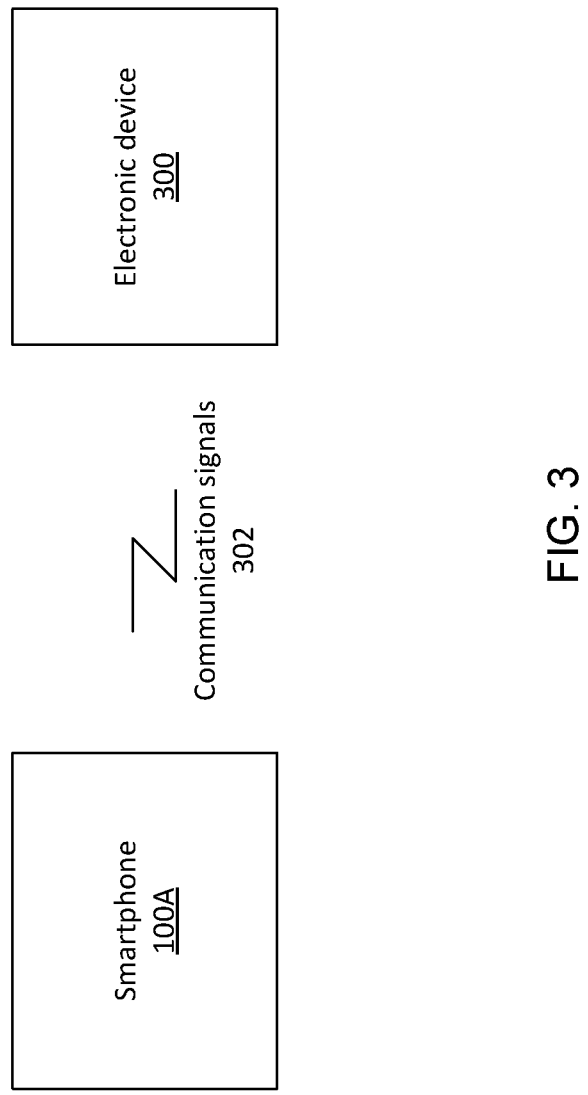
FIG. 3 is an illustration of an electronic device in a communication network, in accordance with an embodiment of the present disclosure.

FIG. 3 is an illustration of an electronic device in a communication network in accordance with an embodiment of the present disclosure. Referring to FIG. 3, there is shown the smartphone 100A and an electronic device 300. The smartphone 100A may communicate with the electronic device 300 using the communication interface 230. The communication may be via communication signals 302 between the electronic device 300 and the smartphone 100A. The communication signals 302 may be via a wired communication protocol or a wireless communication protocol. Although not shown, the communication signals 302 may be sent via one or more communication units between the electronic device 300 and the smartphone 100A. For example, the electronic device 300 and the smartphone 100A may belong to the same network or different networks.

Figure 4:
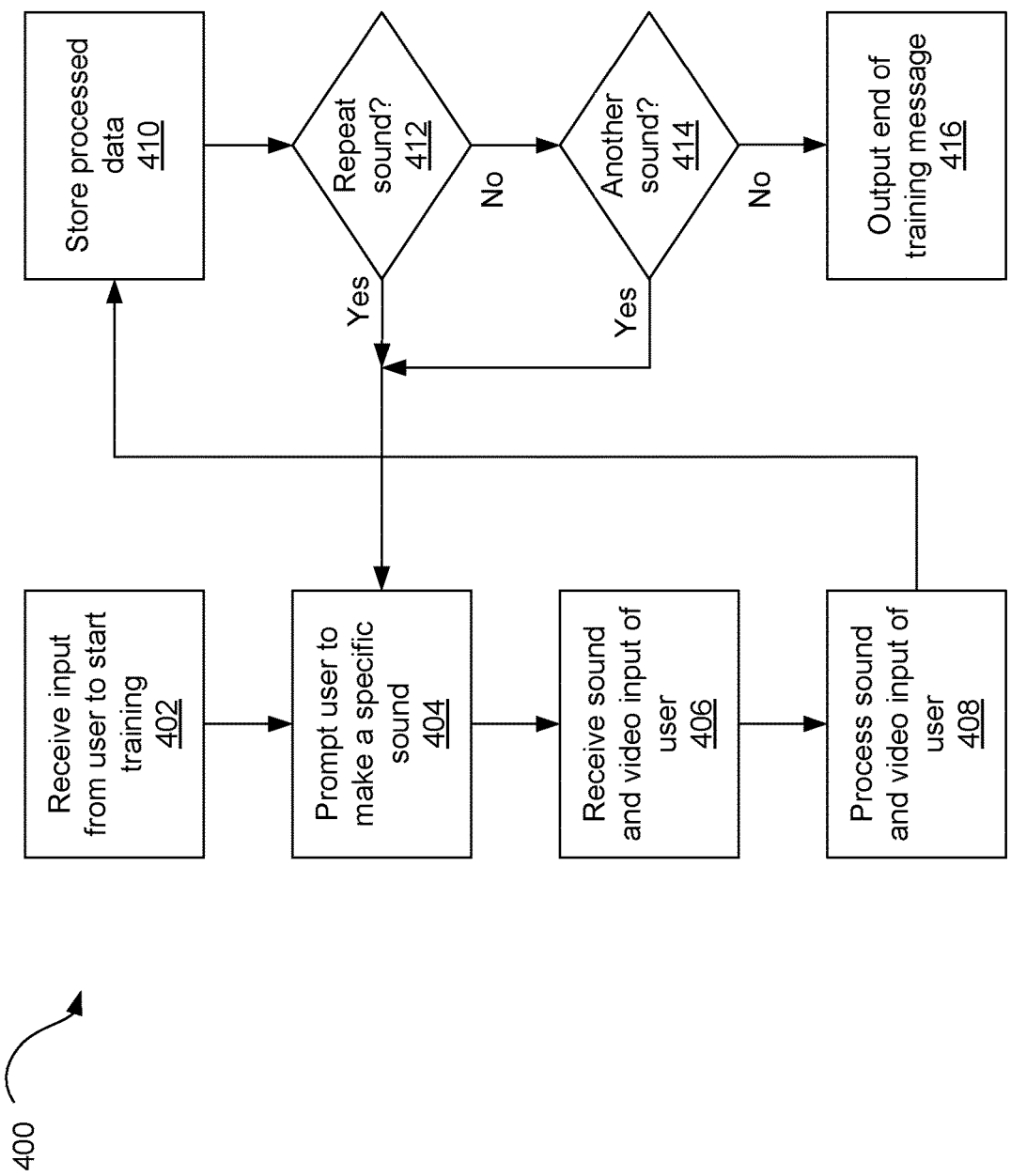
FIG. 4 is a flow diagram of an example of training an electronic device to recognize a user, in accordance with an embodiment of the present disclosure.

FIG. 4 is a flow diagram of an example of training an electronic device to recognize a user, in accordance with an embodiment of the present disclosure. Referring to FIG. 4, there is shown an example flow diagram 400 for training an electronic device 100 such as, for example, the smartphone 100A. At block 402, input is received from a user to start a training process. The input may be, for example, the user tapping on an appropriate key displayed on the smartphone 100A, an appropriate verbal command, etc., to start the training process. At block 404, the smartphone 100A may provide a prompt for a voice input. That is the user is prompted to make a specific sound(s). The specific sound(s) might be a passphrase or other repeatable voice sound(s) that may include words and/or sounds. The term "passphrase" may be used to indicate one or more words and/or sounds in general that is provided by a user for authentication. The passphrase may be, for example, arbitrary. The prompt may indicate, for example, a passphrase that is to be repeated by the user, or the user may be asked to provide the passphrase.

In some cases, a specific sound is not needed, but instead the prompt may direct the user to continuously talk for an amount of time, where the time may be for a set duration so that enough data can be gathered to allow for authentication of the user, or until a time-out occurs at which point it may be indicated that the user cannot be authenticated. At block 406, the smartphone 100A may then be ready to capture the sound the user makes with the second sensor (microphone) 124 and capture the face of the user making the sound with the first sensor (camera(s)) 122.

At block 408, a processor such as, for example, the processor 200 and/or the processor 112 may process the captured audio and video. Different types of camera system may be used to capture the facial motion (facial movements) of the user. For example, a 3-D camera may be used or a high-speed camera that is able to provide motion capture at a high frame rate may be used. As stated previously, other types of cameras may also be used such as, for example, ultrasound, sonar, optical speckle/interference, radar, Lidar, time of flight devices, scanned systems, etc. In many cases, a higher level of security may be obtained when using 3-D motion data. However, in an embodiment, 2-D motion capture of the face alone may be sufficient to authenticate a user at a lower relative level of security. The process may include using a video stream to build up a dynamic model of the user's face. In general, the dynamic model may include a recording of the 3-D representation of the surface of the face, but, in addition, may also include details as to how the face moves both as a whole as well as in detail. Motions of individual muscles and/or muscle groups, as well as associated movements of the skin, may be unique to the particular physiology of the user. In some cases, a 2-D motion capture may be used in addition to the 3-D motion capture at the same time. There, the 2-D video may pick up texture or other surface details that the 3-D camera may not show, thereby improving the authentication level.

The processing may comprise, for example, correlating in time the sound made by the user with the facial motion (facial expressions) made by the user when making the sound. The processing may match, for example, specific muscle movements that may be different for each user in location, duration, etc., where the muscles may be located on or around the mouth of the user. Correlation may also be made with movements in other areas of the face to various frequencies and features of the captured audio. Muscle movements during speech may be voluntary and/or involuntary, and both types may be captured and correlated with the face. Correlation between voice and video may be necessary but may not be completely sufficient for some levels of security. For example, correlation between voice and video may be necessary for the highest level of security, but it may not be sufficient. While voice and video might correlate well with each other, if an unauthorized user is attempting to unlock the device, the unauthorized user's face shape and facial motions may not match the dynamic model of the authorized user's face and/or the voice may not match the authorized user. One or more of these muscle movements may also be involuntary and also be very short in duration. Some of these movements may not be readily apparent to a person looking at the user but may be captured in the video stream and may be used to further correlate with the authorized user.

At block 410, the processed data may be stored for future use. In one embodiment, the authentication system may have a library of typical facial motion (facial movements) of the user for various sounds spoken by the user. Various embodiments may specify a language for the passphrase as the language set for the device, while other embodiments may not specify a specific language for a passphrase. The library may be used to correlate the movements and sounds with words spoken by the user, where the words/sounds may be arbitrary. However, if a particular sound or passphrase was chosen as part of the authentication, knowledge or language or associated facial movements could be unnecessary. In this case, the particular sounds and associated facial motions could be captured together and correlated. Correlation may not be just by matching up general motion with volume changes of the sound, but may be more sophisticated. For example, vowels and consonants are made by various portions of the vocal system actively modulating the air flow. These modulations are repeatable yet details may be unique to a particular person. Each modulation causes a measurable change in the face as each sound is created.

Some modulations made are passive in nature. Sinuses and other cavities change the nature of the sound created not just as the words are spoken but also in adjusting timbre, tone, and/or other characteristics. These characteristics can aid in audio identification of the voice of the user. Other portions of the face also react passively to sound and movement. In particular, air motion as well as pitch of the voice create a variety of vibrations in and around the mouth. Depending on the thickness of skin, muscles, fat, and/or bone that is near the surface, higher frequency vibrations may be visible or may be dampened. Higher frequency vibrations may be perceptible in the teeth as well. When 3-D video is taken of the facial movements at high speed, measurements of the depth movements of these various areas around the face will exhibit this combination of high and low frequency movements that are unique to the physiology of the user.

For successive iterations of processed data generated for the same stimulus, the stored data may be updated as needed to take into account the results of processing for the latest iteration.

At block 412, a determination may be made as to whether the user should make another iteration of the same sound. If the same sound is to be made again, then a prompt may be given for that sound at block 404. Repetitive analysis may identify specific muscle movements that occur more consistently, and these may be used preferentially or at least given greater weight. Determining the specific muscle movements to use for future authentication may depend on, for example, how reliably those muscle movements occur. Repetitions of the input of the sound may also be deliberate as there are natural variations in how a particular phrase or sound is spoken. By comparing and contrasting multiple iterations of the same input sound, an envelope can be generated where the expected input does not need to be spoken with exact precision to be recognized as coming from the authenticated owner, yet still provide a very high level of security.

The authentication process may also, for example, locate the local areas that have never had any micro-expressions associated with them. Some or all of these local areas may also be specified for authentication purposes.

Determination of whether a user is identified may use one of many different algorithms, including, for example, matching at least a first percentage of category one features. Other embodiments may also require matching at least a second percentage of category two features, etc. The category one features may be those muscle movements or small dynamic expressions that are reliably detected every time. The category two features may be those muscle movements or dynamic expressions that are detected most of the time. While the first percentage and the second percentage may be the same, they may also be different. Furthermore, a particular application may require its own matching rate. For example, a bank server may provide a matching rate percentage for authenticating the user for certain transactions.

If the same sound need not be made any more by the user, then at block 414, a determination may be made as to whether a different sound should be made by the user. By using multiple different sounds, a user may be more accurately identified. If the user is to make another sound, then a prompt is given for that sound at block 404. If the user does not need to make another sound, then the training is over and the smartphone 100A may output a message at block 416 indicating that the training session is finished.

Although the dynamic model of the face can be directly correlated with the sound at both high and low frequencies in multiple regions of the face, in a separate embodiment, this correlation may not be explicitly laid out in an algorithm. The entirety of the feature sets of both sounds and video over multiple iterations can be fed into a neural net or other type of machine learning to train it to the user's face, facial movements and voice, as well as the correlations between the facial movements and voice. Thus during the training process, the phone may appear to "bond" with the user such that the phone will only respond to that particular combination. That is, the phone and the user may be paired or uniquely locked together. With enough correlation, authentication security can still be held to an extremely high level. The machine learning may be trained simultaneously on all three of facial movements and shape, voice of the user, and dynamic correlations between the two all at the same time. In this respect, the machine learning portion itself could act as a dynamic model of the user without an explicit other model.

Various embodiments of the disclosure may use one or more occasions where the user is speaking to further refine the authentication process. This may include, for example, when the user is speaking and the user's face is visible to an appropriate camera of the smartphone 100A, including those occasions when the user is being identified. This may be thought of as additional iterations of making the same sound or set of sounds repeatedly during the training session.

After training the smartphone 100A to identify a user, the smartphone 100A may have the user say one or more words that includes the sound(s) that the user made during the training session. This may be a more natural form for the user to say, and, therefore, makes it easier for the user. The smartphone 100A may also allow the user to select from several different phrases that includes the sound(s) to allow further individualization in authenticating the user. Accordingly, if the user does not use the right phrase, then the smartphone 100A may indicate an authentication failure. In cases where authentication does not require a particular passphrase, a high level of security may still be achieved by directing the user to continue speaking to the phone for a sufficiently long enough time such that the authentication system reaches a high enough confidence level to authenticate the user.

Accordingly, a user may be identified by having the user speak a specific passphrase of the user's choosing, speak a passphrase indicated by the electronic device such as the smartphone 100A, repeat a passphrase indicated by the electronic device, or just speak for a certain amount of time.

Various embodiments may have different architectures for processing the captured audio and video. For example, one architecture may have general processors run specific software for processing the captured voice and/or video. Another architecture may have a dedicated processor for processing the video, while still another architecture may have a dedicated digital signal processor for processing the video and another dedicated digital signal processor for processing the audio. Accordingly, there is no limitation regarding the type of a processor and/or the number of processors used by an implementation of the disclosure.

Additionally, the smartphone 100A may be trained to recognize more than one user. Accordingly, in such cases, the user may select the user's name and the processing at block 408 may require processing the sound and video input to try to match to the specific user. In other cases, the user may not have to select the user's name, and the processing may try to match to each of the different users until a match is made, or there is no match. In one embodiment, the smartphone 100A may allow logins with varying levels of security and access. For example, the main authenticated user may be allowed full access to all functions of the smartphone, whereas a secondary user might only be allowed a limited subset of functions on the device. A graduated level of security may have other benefits even if the device has only a single authenticated user. The user might attempt to login using facial movements but be in a place where he cannot speak out loud. By silently speaking a passphrase, the authentication system might be able to determine a match for the facial motion (facial movements) to authenticate user with a lower level of confidence, allowing at least a limited subset of functions to be accessed.

Furthermore, while training the smartphone 100A was described, various embodiments may allow another electronic device 100 to download information for recognizing a user. The electronic device 100 may already have been trained for recognizing the user, and, therefore, has the information needed to be able to compare to the user input of voice and video capture. This may require, for example, authenticating the user at the electronic device 100 as well as the smartphone 100A by using, for example, a login/password method before downloading the authentication information. Other embodiments may have a server (not shown) control remote authentication modules (not shown), and, therefore, download the user(s) information as needed. For example, the remote authentication modules may have the capability to identify a user using the downloaded user(s) information. Where a user is not able to be identified, the remote authentication module may contact the server in case the server can identify the user. If so, that information may then be downloaded to the remote authentication modules for future use.

It should be further stressed that the voice input (or passphrase) may comprise words and/or sounds regardless of the tone or intonation of the voice input. For example, the voice input may be sung, yodeled, whispered, etc. Various embodiments may also accept silent mouthing of the passphrase where the silently mouthed motions for the passphrase are very similar to that of speaking out loud the voice input.

Figure 5:
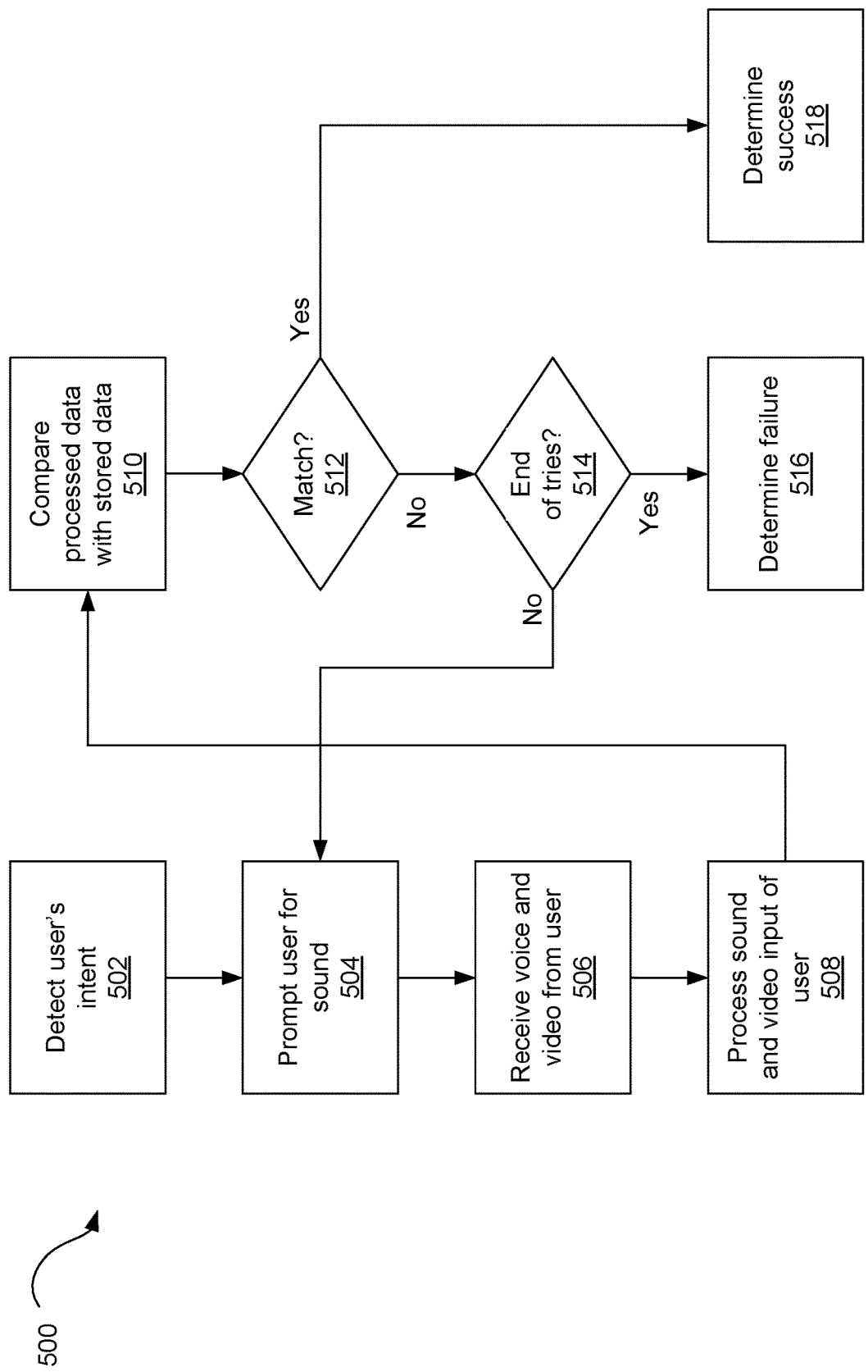
FIG. 5 is a flow diagram of an example of an electronic device recognizing a user, in accordance with an embodiment of the present disclosure.

FIG. 5 is a flow diagram of an example of an electronic device recognizing a user, in accordance with an embodiment of the present disclosure. Referring to FIG. 5, there is shown an example flow diagram 500 of a user with a smartphone 100A. In block 502, an indication to identify the user is received. This may be due to a selection by the user for an option to start the authentication process by, for example, detecting motion of the phone being picked up after being at rest, using a tactile action such as pressing a button or toggling/moving a switch, a voice input by the user, etc.

An application may also indicate a need for authentication. For example, if the user wants to transfer money, or buy a product, the application being used may initiate authentication. Or the bank server or the merchant server may command the application to authenticate the user.

At block 504, the smartphone 100A may provide a prompt to the user to input one or more sounds via the microphone 242c. Depending on the options available, the user may be prompted to make specific sounds, prompted to speak the passphrase known to the user, or speak for a period of time. Although the passphrase may be secret to the user, even if it is overheard and used by a second person, the smartphone will not authenticate the second person if they cannot match the dynamic model of the authenticated user.

At block 506, the smartphone 100A may receive the sounds made by the user as well as capture a video of the user's face while the user is making the sounds. At block 508, the sounds and video may be processed to determine the processed data needed to compare to the stored data for authenticating a user. The sounds may be identified so that an appropriate comparison may be made for the motion detection. The processed data may be for the motion detection, or the captured facial motion, that includes, for example, the micro-expressions of the user. The processing may use information from the stored data such as, for example, the number of local areas and sizes of the local areas along with other details of the facial or other models.

At block 510, the processed data may be compared to the stored data. If a match is found at block 512, then success may be indicated at 518. If a match is not made at block 512, a determination may be made at block 514 as to whether the allowed number of tries has been met. The allowed number of tries may be set by the user and/or an external device such as, for example, the bank server that is requesting the authentication of the user.

If the number of tries has been met, then block 516 may indicate failure to the user and/or the external device that requested the authentication. If the number of tries has not been met, then the user may be prompted to try again at block 504. Some embodiments may allow the user to speak other passphrases while other embodiments may only allow the user to repeat the previously spoken passphrase.

Over time, small physiological changes could lead to changes in the dynamic model of the face and/or user that would lead to difficulties in authentication. To avoid this, on occasion, the authentication system may prompt the user to refresh the user data by repeating the process shown in FIG. 4. Alternatively, or in addition, when the user authenticates to the device using the process of FIG. 5, the authentication system might update the dynamic model of the user to account for small changes in the user if they are less than an allowed threshold.

Furthermore, processing may also examine not just the micro-expressions of the face, but may also compare the facial shape, relative sizes/relationship of parts (features such as nose, eyes, mouth, etc., of the face), and motions of the face to the dynamic model. Accordingly, various embodiments may match facial motions (micro-expressions) and also the user's biometric facial features to get a very high level of confidence in the security of the authentication.

Figure 6:
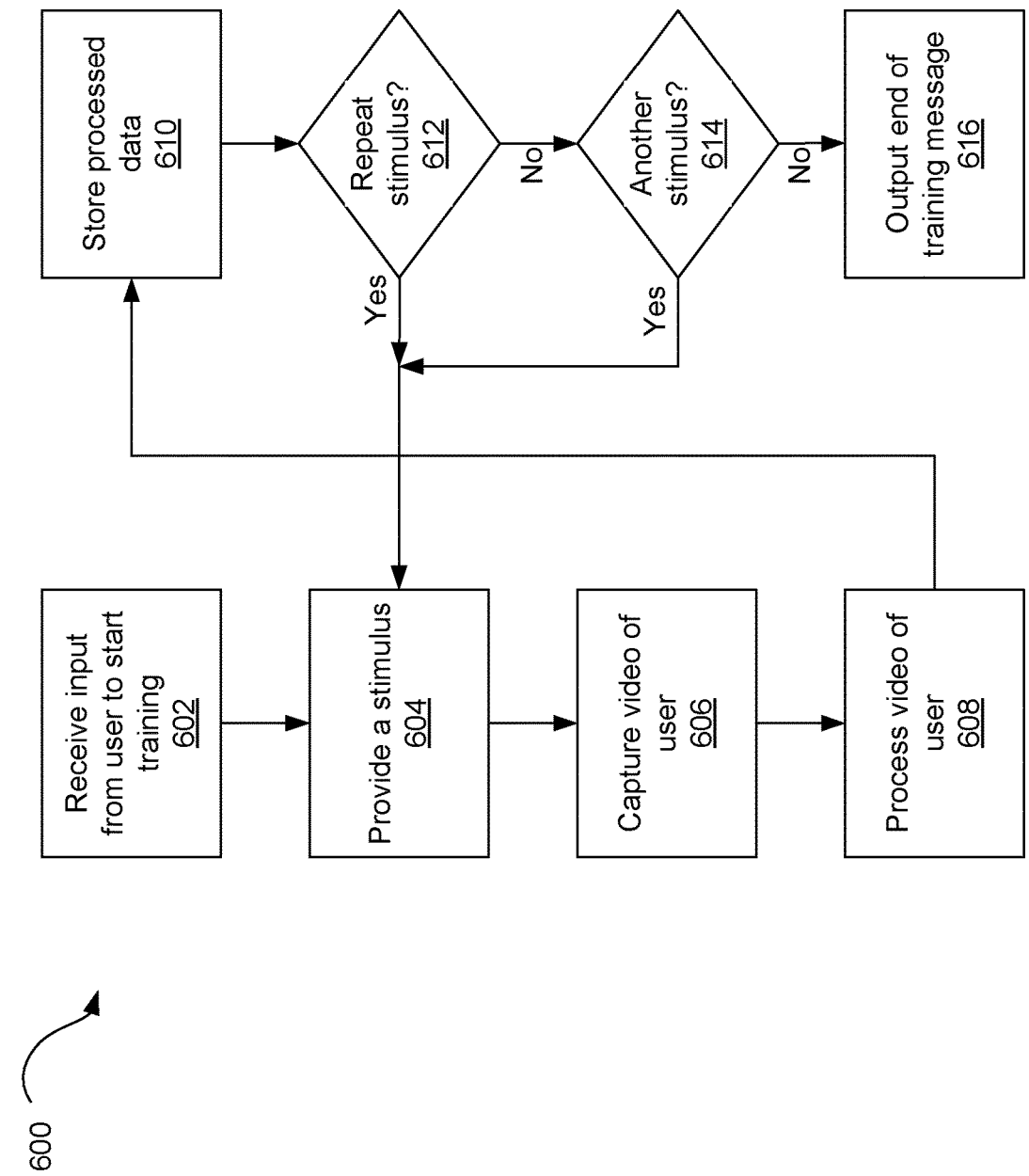
FIG. 6 is another flow diagram of an example of training an electronic device to recognize a user, in accordance with an embodiment of the present disclosure.

FIG. 6 is another flow diagram of an example of training an electronic device to recognize a user, in accordance with an embodiment of the present disclosure. Referring to FIG. 6, there is shown an example flow diagram 600 for training an electronic device 100 such as, for example, the smartphone 100A.

At block 602, input is received to start a training process. The input may be, for example, the user tapping on an appropriate key displayed on the smartphone 100A, an appropriate verbal response, etc., to start the training process. At block 604, the smartphone 100A may provide a stimulus for the user. The stimulus may be a picture of a loved one or a sound made by a loved one, and may be referred to as an emotional stimulus. The user may choose from a plurality of emotional stimuli that may be available for an authentication process. The emotional stimuli may be from videos, pictures, and/or sound recordings that are available in the smartphone 1001A or to the smartphone 100A.

At block 606, the smartphone 100A may capture the face of the user during the duration of the stimulus with the first sensor (camera(s)) 122. This may be referred to as capturing motion detection of the user's face. The capture time may be brief and not necessarily for the entire duration of the stimulus. The capture time may be determined by analyzing the video of the user, where it may be determined that the desired muscle movements, or micro-expressions, have been captured within a certain period of time.

At block 608, a processor such as, for example, the processor 200 and/or the processor 112 may process the captured video. The processing may comprise, for example, determining specific micro-expressions in the face that may be involuntary and normally not visible to a person looking at the user. Although the term "micro-expressions" can be used to denote the fleeting expressions that take place as a configuration of the face at a snapshot in time, as used herein the term may also include not just the snapshot but the entire dynamics of the face before, during, and after the expressions occur. That is, the emotional response may comprise the facial motion kinetics when the emotional stimulus is provided. The micro-expression may include voluntary and involuntary muscle movements. These micro-expressions may occur upon seeing a loved one and/or hearing the voice of a loved one. This emotional response is unlikely to occur similarly enough in a different user to the same emotional stimulus given by the device, and thus may act as an "emotional passphrase."

Different types of camera system may be used to capture the facial movements (motion detection) of the user. For example, a 3-D video camera may be used or a high-speed 2-D camera that is able to provide motion capture at a high frame rate. The 2-D camera may provide, however, a lower confidence level of authentication than data provided by the 3-D camera. The processing may match, for example, specific micro-expressions correlated to speaking the passphrase that may be different for each user in location, duration, etc., where the muscles may be located, for example, in or around the mouth and/or eyes of the user. Accordingly, a user may be able to be identified by correlating specific micro-expressions of the emotional response to the emotional stimulus. Note that the emotional response of the user may be necessary but not sufficient for full authorization. Processing of the video may also comprise building up a dynamic model of the face and facial motions of the authorized user, similar to the process used in FIG. 4.

At block 610, the micro-expressions correlated to the passphrase may be stored as data, and may be referred to as an expected emotional response. A simple example of identifying the micro-expressions may be, for example, identifying the mouth region and then mapping the mouth region to smaller regions. For example, the mouth region may be formed into local areas where a local area may be related to a percent of a width of the mouth. This will allow local areas to be formed that are relative to a user's mouth without having to determine an absolute length of the user's mouth. These local areas may then be mapped to micro-expressions at different times with respect to each other. For example, voxels may provide 3-dimensional mapping of the local areas to give information regarding the micro-expressions in three dimensions as well as the duration of the micro-expressions. When 3-dimensional mapping is not used, a high-speed camera may be able to capture the micro-expressions to map the micro-expressions with respect to duration and location. Accordingly, the processing may comprise indicating the amount and duration of micro-expressions in specific local areas with respect to other micro-expressions.

Various embodiments may have the local areas be a constant set where the number of local areas is pre-determined and the sizes of the local areas are the same. Other embodiments may vary, as needed, the number of local areas and the size of each local area. Some embodiments may use both methods where initially there may be a default number of local areas of a constant size, and then as training progresses, the number of local areas may be changed as well as the size of each local area.

For example, the video may be processed and analyzed to determine the micro-expressions of interest. These micro-expressions may occur in certain portions in and/or around the mouth where the portions may differ in size. When the smartphone 100A is trained for a user, part of the information determined may be the number of local areas, and the sizes of the local areas. Then, when a user is being authenticated, the authentication process may use the specified local areas (in number and size of each local area) to look for the specific micro-expressions.

While the region of the mouth was used as an example for detecting micro-expressions of the user, various embodiments need not be limited so. For example, there may be other regions of the face such as, for example, around the eyes that may also be useful in providing micro-expressions, or a larger region of the face, or even the entire face.

For successive iterations of processed data generated for the same stimulus, the stored data may be updated as needed to take into account the results of processing for the latest iteration.

At block 612, a determination may be made as to whether the user should be given the same emotional stimulus again. If the same emotional stimulus is to be given again, then the emotional stimulus may be provided at block 604. Repetitive analysis may provide specific micro-expressions that occur more consistently, and these may be used for authentication, or at least given greater weight. Determining the specific micro-expressions to use for future authentication may depend on, for example, how reliably those micro-expressions occur.

The authentication process may also, for example, locate the local areas that have never had any micro-expressions associated with them. Some or all of these local areas may also be specified for authentication purposes.

Determination of whether a user is identified may use one of many different algorithms, including, for example, matching at least a first percentage of category one features. Other embodiments may also require matching at least a second percentage of category two features, etc. The category one features may be those micro-expressions that are reliably detected every time. The category two features may be those micro-expressions that are detected most of the time. While the first percentage and the second percentage may be the same, they may also be different. Furthermore, a particular application may require its own matching rate. For example, a bank server may provide a desired matching rate percentage for authenticating the user for certain transactions.

If the same stimulus need not be given to the user, then at block 614, a determination may be made as to whether a different stimulus should be given to the user. By using multiple different stimuli, a user may be more accurately identified. If the user is to be given another stimulus, then another stimulus may be provided at block 604. If the user does not need to be given another stimulus, then the training is over and the smartphone 100A may output a message at block 616 indicating that the training session is finished.

Various embodiments may have different architectures for processing the captured video. For example, one architecture may have general processors run specific software for processing the captured video, and another architecture may have a dedicated processor for processing the video. Accordingly, there is no limitation regarding the type of a processor and/or the number of processors used by an implementation of the disclosure.

Additionally, the smartphone 100A may be trained to recognize more than one user. Accordingly, in such cases, the user may select the user's name and the processing at block 608 may require processing the video input to try to match to the specific user. In other cases, the user may not have to select the user's name, and the processing may try to match to each of the different users until a match is made, or there is no match.

Furthermore, while training the smartphone 100A was described, various embodiments may allow another electronic device 100 to download information for recognizing a user. The electronic device 100 may already have been trained for recognizing the user, and, therefore, has the information needed to be able to compare to the captured video of the user. This may require, for example, authenticating the user at the electronic device 100 as well as the smartphone 100A by using, for example, a login/password method before downloading the authentication information. Therefore, the electronic device 100 may download the emotional stimuli and the corresponding expected emotional responses to the smartphone 100A.

Additionally, some embodiments may also compare biometric traits such as, for example, the facial shape, relative sizes/relationship of parts (features such as nose, eyes, mouth, etc., of the face), etc. Accordingly, additional matching of the authorized user's biometric facial features and micro-expressions may grant a very high level of confidence in the security of the authentication.

Figure 7:
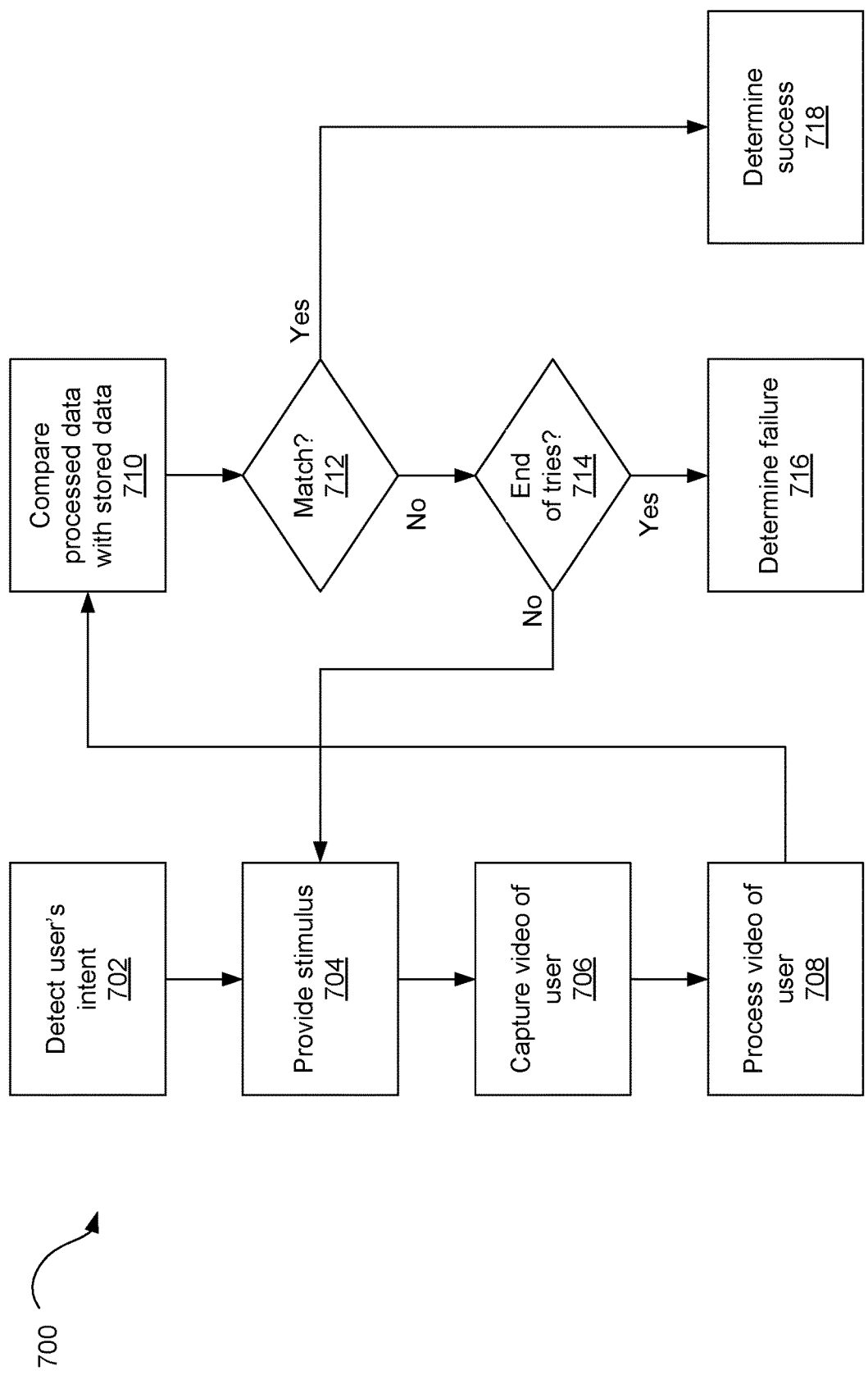
FIG. 7 is another flow diagram of an example of an electronic device recognizing a user, in accordance with an embodiment of the present disclosure.

FIG. 7 is another flow diagram of an example of an electronic device recognizing a user, in accordance with an embodiment of the present disclosure. Referring to FIG. 7, there is shown an example flow diagram 700 of a user with a smartphone 100A. In block 702, an indication to identify the user is received. This may be due to a selection by the user for an option to start the authentication process by, for example, detecting motion of the phone being picked up after being at rest, detecting a user's tactile inputs such as pressing a button, toggling a switch, a voice input by the user, etc. The indication may also be, for example, a request by an application to identify the user to start or complete a transaction with an external device. For example, if the user is logging on to an online bank account, the bank application on the user's smartphone 100A may request authentication prior to connecting to the bank, or a bank server may request that the user be identified prior to completing a large transaction, etc.

At block 704, the smartphone 100A may provide an emotional stimulus to the user. At block 706, the smartphone 100A may capture a video of the user's face while the emotional stimulus is provided, or for the capture time determined during training described with respect to FIG. 6. At block 708, the captured motion detection may be processed to determine the processed data needed to compare to the stored data of the expected emotional response for authenticating a user. The processing may use information from the stored data such as, for example, the number of local areas and sizes of the local areas. Processing may also examine not just the micro-expressions of the face, but may also compare the facial shape, relative sizes/relationship of parts (features such as nose, eyes, mouth, etc., of the face), and motions of the face to the dynamic model. Although it may be remotely possible for an unauthorized user to exhibit very similar involuntary reactions to the given stimulus, additional matching to the authorized user's biometric facial features and facial motions may grant a very high level of confidence in the security of the authentication.

At block 710, the processed data may be compared to the stored data. If a match is found at block 712 to the expected emotional response, then success may be indicated at block 718. If a match is not made at block 712, a determination may be made at block 714 as to whether the allowed number of tries has been met. The allowed number of tries may be set by the user and/or an external device such as, for example, the bank server, that is requesting the authentication of the user.

If the number of tries has been met, then block 716 may indicate failure to the entity (user or external device) that request the authentication. If the requesting entity is an external device, the user may also be notified of the failure. If the number of tries has not been met, then the user may be provided the emotional stimulus at block 704, where the emotional stimulus may be the same one provided previously, or a different emotional stimulus.

While various embodiments of the disclosure were disclosed, it should be noted that a specific task that may have been described with respect to one particular embodiment may also be used in other embodiments if applicable. That is, the scope of the disclosure is not limited to only those embodiments that were described.

Therefore, it can be seen that various embodiments of the present disclosure relate to methods and systems for user authentication, which may be used, for example, to authenticate a user for accessing various devices and/or for conducting various transactions including financial transactions.

An embodiment of the disclosure may disclose a method for authenticating a user with an electronic device may comprise providing a pre-determined emotional stimulus to the user, capturing, with a 3-dimensional video camera, motion detection of the user's face for at least a portion of a time the pre-determined emotional stimulus is provided, processing the captured motion detection to identify emotional response of the user, and comparing the identified emotional response with stored data to determine whether to authenticate the user.

The identified emotional response may comprise micro-expressions of the user, where the micro-expressions may include voluntary and involuntary muscle movements. These micro-expressions may sometimes not be able to be distinguished by the naked eye.

The authentication of the user may comprise receiving an input to start the authentication of the user. The input may be one of a user initiated input or an application initiated input. The input may be one of a user selected command, detected motion of the electronic device, a voice input from the user, a request from an application on the electronic device, a request from another electronic device, etc.

When it is determined to not authenticate the user based on the comparison, there may be a retry of the authentication of the user by providing the same pre-determined emotional stimulus or another (different) pre-determined emotional stimulus.

The pre-determined emotional stimulus provided to user may be one or both of a pre-recorded sound and a pre-recorded video. The emotional stimulus may have been selected, for example, by the user during a previous setup for the authentication process. The user's emotional response to the emotional stimulus at that time is stored as the expected emotional response for that emotional stimulus. There may be several emotional stimuli selected by the user, and, therefore, several expected emotional responses stored in memory/storage. Accordingly, the stored data comprises one or more expected emotional responses from the user corresponding to one or more pre-determined emotional stimuli, and the one or more expected emotional responses are processed from the user's previous emotional responses to being shown the pre-determined emotional stimuli. In some cases, the stored expected emotional responses may be downloaded from another electronic device where the authentication process may have been set up.

Another embodiment of the disclosure may comprise an electronic device configured to authenticate a user. The electronic device may comprise one or more output devices configured to provide a pre-determined emotional stimulus to the user, a 3-dimensional video camera configured to capture motion detection of the user's face for at least a portion of a time the pre-determined emotional stimulus is provided, and a processor configured to process the captured motion detection to identify emotional response of the user and compare the identified emotional response with stored data in memory to determine whether to authenticate or not authenticate the user.

The processor configured to process the captured motion detection may be configured to identify micro-expressions of the user. The processor may be configured to identify the micro-expressions of the user by detecting voluntary and involuntary muscle movements. The electronic device may be configured to receive an input to start authentication of the user, where the input may be a user initiated input or an application initiated input.

The input may be from one of a tactile input device activated by the user (either by touch such as a touch sensitive screen, button, etc., or by manipulation such as a switch, pressing a button, etc.), a motion sensor configured to detect motion of the electronic device, a microphone configured to receive voice input from the user, a request from an application on the electronic device, a transceiver configured to receive a request from another electronic device.

When the processor determines to not authenticate the user based on the comparison, the processor may be configured to retry authentication of the user by providing the same pre-determined emotional stimulus or a different pre-determined emotional stimulus. The pre-determined emotional stimulus may be one or both of a pre-recorded sound and a pre-recorded video.

The stored data may comprise one or more expected emotional responses from the user corresponding to one or more pre-determined emotional stimuli, and the one or more expected emotional responses may be the user's previous emotional responses to being shown the pre-determined emotional stimuli.

Another embodiment of the disclosure may be a method for authenticating a user with an electronic device, comprising receiving a voice input spoken by the user, receiving a video input, via a 3-dimensional video camera, of facial motion of the user as the user says the voice input, correlating the facial motion with the received voice input, and comparing the correlated facial motion with stored data to determine whether to authenticate or not authenticate the user.

The stored data may comprise expected facial motion, and the expected facial motion may have been captured when the user said the voice input previously, for example, when the authentication method was set up.

The authentication may comprise prompting the user to say a pre-determined voice input. The facial motion may comprise micro-expressions, which may include voluntary and involuntary muscle movements.

The authentication may initiate when an input is received to start authentication of the user. The input may be, for example, a user initiated input or an application initiated input. The input may be, for example, a user selecting a command, a sensor in the electronic device detecting motion of the electronic device, a verbal input from the user, a request from an application on the electronic device, a request from another electronic device, etc.

When it is determined to not authenticate the user based on the comparison, there may be a retry to authenticate the user by prompting the user to say the same voice input or another (different) voice input.

Another embodiment provided in the disclosure may comprise an electronic device configured to authenticate a user, comprising a microphone configured to receive a voice input spoken by the user, a 3-dimensional camera system configured to capture facial motion of the user, and a processor configured to correlate the facial motion with the received voice input and compare the correlated facial motion with stored data to determine whether to authenticate or not authenticate the user.

The stored data may comprise a previously captured expected facial motion correlated to the voice input. The expected facial motion is the facial motion captured when, for example, the user previously spoke the voice input. This may have been during a setup for the authentication process. Facial motion may comprise micro-expressions that may include voluntary and involuntary muscle movements.

The electronic device may comprise, for example, an output device configured to output a prompt to the user to say a pre-determined voice input. The output device may be, for example, a speaker and/or a visual display.

The processor is configured to process the received voice input to determine whether the voice input is a pre-determined voice input, where a voice input comprises one or more words. The voice input may also comprise sounds.

The electronic device may be configured to receive an input to start authentication of the user where the input is a user initiated input or an application initiated input. The input may be, for example, a tactile input device activated by the user (including, for example, a touch sensitive screen/button/etc., or a toggle switch, a button to be pressed, etc.), a motion sensor configured to detect motion of the electronic device, a microphone configured to receive voice input from the user, a request from an application on the electronic device, or a transceiver configured to receive a request from another electronic device.

When it is determined to not authenticate the user based on the comparison, the processor may be configured to retry the authentication of the user by prompting the user to say the voice input. The voice input may be the same voice input or a different voice input.

Accordingly, it can be seen that by processing the micro-expressions of the face and/or other biometric features such as the facial shape and relative sizes/relationship of parts of the face may grant a very high level of confidence in the security of the authentication.

Therefore, it can be seen that various embodiments of the disclosure can be used in many applications by authenticating the user for many purposes with reliability, speed, and security.

Various parts of the various embodiments of the disclosure may be written as computer programs and may be implemented processors that execute the programs using a non-transitory machine-readable storage medium. Non-transitory machine-readable storage medium may include, for example, magnetic storage media (e.g., ROM, floppy disks, hard disks, etc.), optical storage media (e.g., CD-ROMs, or DVDs), FLASH drives, etc.

While various embodiments of the disclosure have been described with reference to the figures, it will be understood by those of ordinary skill in the art that various changes in form and details may be made therein without departing from the spirit and scope of the disclosure as defined by the following claims. Accordingly, the above embodiments and all aspects thereof are examples only and are not limiting.

What are claimed:

1. A method of an electronic device, the method comprising:
   providing a pre-determined emotional stimulus to a user;
   capturing, with a 3 dimensional video camera, motion detection of the user's face for at least a portion of a time that the pre-determined emotional stimulus is provided;
   processing the captured motion detection to identify an emotional response of the user to the pre-determined emotional stimulus;
   determining, based on data representative of one or more prior emotional responses of a specific user to the pre-determined emotional stimulus, whether the identified emotional response of the user corresponds to an expected emotional response of the specific user;
   granting the user access as the specific user after determining that the identified emotional response corresponds to the expected emotional response of the specific user; and
   retrying authentication of the user by providing the pre-determined emotional stimulus again or providing another pre-determined emotional stimulus for which data has been generated from one or more prior emotional responses of the specific user to the another pre-determined emotional stimulus.

2. The method of claim 1, wherein the identified emotional response comprises micro expressions of the user.

3. The method of claim 2, wherein the micro expressions include voluntary and involuntary muscle movements.

4. The method of claim 1, comprising receiving an input to start authentication of the user.

5. The method of claim 4, wherein the input is one of: user initiated input or an application initiated input.

6. The method of claim 4, wherein the input is one of: a user selected command, detected motion of the electronic device, a voice input from the user, a request from an application on the electronic device, or a request from another electronic device.

7. The method of claim 1, wherein the pre-determined emotional stimulus is one or both of: a prerecorded sound and a prerecorded video.

8. The method of claim 1, further comprising:
   providing the pre-determined emotional stimulus to the user during a training session;
   capturing motion detection of the user's face for at least a portion of a time that the pre-determined emotional stimulus is provided during the training session; and
   generating, based on the motion detection of the user's face during the training session, the data representative of the one or more prior emotional responses of the specific user.

9. An electronic device configured to authenticate a user, the electronic device comprising:
   one or more output devices configured to provide a pre-determined emotional stimulus to the user;
   a 3 dimensional video camera configured to capture motion detection of the user's face for at least a portion of a time that the pre-determined emotional stimulus is provided; and
   a processor configured to:
   process the captured motion detection to identify an emotional response of the user to the pre- determined emotional stimulus;
   determine, based on first data generated from one or more prior emotional responses of a first user to the pre-determined emotional stimulus, whether the identified emotional response of the user corresponds to an expected emotional response of the first user;
   grant the user access as the first user after determining that the identified emotional response corresponds to the expected emotional response of the first user; and
   retry authentication of the user by providing the pre-determined emotional stimulus again or providing another pre-determined emotional stimulus for which data has been generated from one or more prior emotional responses of the first user to the another pre-determined emotional stimulus.

10. The electronic device of claim 9, wherein the processor configured to process the captured motion detection is configured to identify micro expressions of the user.

11. The electronic device of claim 10, wherein the processor is configured to identify the micro expressions of the user by detecting voluntary and involuntary muscle movements.

12. The electronic device of claim 9, wherein the electronic device is configured to receive an input to start authentication of the user.

13. The electronic device of claim 12, wherein the input is one of: a user initiated input or an application initiated input.

14. The electronic device of claim 12, wherein the input is from one of: a tactile input device activated by the user, a motion sensor configured to detect motion of the electronic device, a microphone configured to receive voice input from the user, a request from an application on the electronic device, or a transceiver configured to receive a request from another electronic device.

15. The electronic device of claim 9, wherein the pre-determined emotional stimulus is one or both of: a prerecorded sound and a prerecorded video.

16. The electronic device of claim 9, wherein the processor is configured to:
   determine, based on second data generated from one or more prior emotional responses of a second user to the pre-determined emotional stimulus, whether the identified emotional response of the user corresponds to an expected emotional response of the second user; and
   grant the user access as the second user based on determining that the identified emotional response corresponds to the expected emotional response of the second user.

17. A non-transitory machine readable medium storing machine executable instructions that, when executed, cause a computing system to control operations comprising:
   providing a pre-determined emotional stimulus to a user;
   capturing, with a 3 dimensional video camera, motion detection of the user's face for at least a portion of a time that the pre-determined emotional stimulus is provided;
   processing the captured motion detection to identify an emotional response of the user to the pre- determined emotional stimulus;
   receiving information from the user that identifies the user from among a plurality of users;
   retrieving, based on the received information, user specific data for the user from a set of user specific data, wherein each user specific data in the set is generated from prior emotional responses of a respective user to the pre-determined emotional stimulus;

determining, based on the retrieved user specific data, whether the identified emotional response of the user corresponds to an expected emotional response of the respective user associated with the retrieved user specific data;

granting the user access as the respective user associated with the retrieved user specific data after determining that the identified emotional response corresponds to the expected emotional response of the respective user associated with the retrieved user specific data; and retrying authentication of the user by providing the pre-determined emotional stimulus again or providing another pre-determined emotional stimulus for which data has been generated from one or more prior emotional responses of the specific user to the another pre-determined emotional stimulus.

18. The non-transitory machine readable medium of claim 17, wherein:

the captured motion detection comprises micro expressions of the user; and the micro expressions include one or both of voluntary and involuntary muscle movements.

* * * * *